US012772173B2

(12) United States Patent
Raghunathan et al.

(10) Patent No.: US 12,772,173 B2
(45) Date of Patent: Oct. 20, 2026

(54) ELECTRONIC DEVICES WITH THERMAL COMPONENT CARRIER MANAGEMENT

(71) Applicant: Apple Inc., Cupertino, CA (US)

(72) Inventors: Shravan Kumar Raghunathan, San Diego, CA (US); Ajay Singh, San Jose, CA (US); Guillaume Monghal, San Diego, CA (US); Maheedhar Gollamudi, San Diego, CA (US); Pradeep S Sharma, Cupertino, CA (US); Reda Salem, Hallbergmoos (DE)

(73) Assignee: Apple Inc., Cupertino, CA (US)

( * ) Notice: Subject to any disclaimer, the term of this patent is extended or adjusted under 35 U.S.C. 154(b) by 502 days.

(21) Appl. No.: 18/177,690

(22) Filed: Mar. 2, 2023

(65) Prior Publication Data

US 2024/0298264 A1 Sep. 5, 2024

(51) Int. Cl.

*H04W 52/02* (2009.01)
*H04L 5/00* (2006.01)
*H04W 72/02* (2009.01)

(52) U.S. Cl.

CPC ......... *H04W 52/0238* (2013.01); *H04L 5/001* (2013.01); *H04W 72/02* (2013.01)

(58) Field of Classification Search

CPC .... H04W 52/0238; H04W 72/02; H04L 5/001
See application file for complete search history.

(56) References Cited

U.S. PATENT DOCUMENTS 9,036,549 B2 5/2015 Kim et al.
9,253,729 B1 * 2/2016 Sundar ................ H04W 52/028
9,363,059 B2 6/2016 Wang et al.
2010/0105336 A1 * 4/2010 Attar ..................... H04W 72/02 455/574
2011/0026422 A1 * 2/2011 Ma ........................ H04L 5/0053 370/252
2013/0100925 A1 4/2013 Ahn et al.
2016/0095086 A1 * 3/2016 Zhang ................... H04L 5/0085 370/329
2017/0012760 A1 1/2017 Feuersaenger et al.
(Continued)

FOREIGN PATENT DOCUMENTS

EP 3352493 B1 3/2021
JP 7095017 B2 7/2022

*Primary Examiner* — Won Tae C Kim

(74) *Attorney, Agent, or Firm* — Treyz Law Group, P.C.; Michael H. Lyons

(57) ABSTRACT

A user equipment device may include a radio that conveys wireless data with one or more base stations using a set of component carriers (CCs) that are concurrently-active under a carrier aggregation scheme or a dual connectivity scheme. When in a thermally-constrained state, a resource manager on the radio may intelligently select a CC to drop from use in conveying the wireless data. The resource manager may select the CC to drop based on the bandwidths, data rates, error rates, and/or activation/deactivation rates of the set of CCs, a power budget assigned to the radio, and/or information about the demodulation and decoding clusters in a modem of the radio. Selecting the CC to drop in this way may provide greater power and temperature reduction at the radio and/or less wireless performance reduction than blindly dropping the most recently added CC from use in conveying the wireless data.

20 Claims, 7 Drawing Sheets

(56) References Cited

U.S. PATENT DOCUMENTS

| | | | | |
|---|---|---|---|---|
| 2021/0105596 | A1* | 4/2021 | Prabhakar | H04W 4/50 |
| 2021/0153117 | A1* | 5/2021 | Nam | H04W 72/12 |
| 2022/0124837 | A1* | 4/2022 | Jones | H04W 72/542 |
| 2022/0182198 | A1* | 6/2022 | Geekie | H04B 7/0626 |
| 2022/0337360 | A1* | 10/2022 | Lee | H04L 5/001 |
| 2023/0088031 | A1 | 3/2023 | Zhang et al. | |
| 2023/0199672 | A1* | 6/2023 | Takeda | H04W 52/281 455/323 |
| 2023/0319786 | A1* | 10/2023 | Zheng | H04L 5/0053 370/329 |
| 2023/0413209 | A1* | 12/2023 | Abotabl | H04W 24/08 |
| 2024/0292323 | A1* | 8/2024 | Abotabl | H04W 8/22 |

* cited by examiner

ELECTRONIC DEVICES WITH THERMAL COMPONENT CARRIER MANAGEMENT

FIELD

This disclosure relates generally to wireless communications, including wireless communications performed by user equipment devices.

BACKGROUND

Communications systems can include electronic devices with wireless communications capabilities. The wireless communications capabilities can include cellular telephone capabilities. An electronic device with cellular telephone capabilities uses wireless circuitry to communicate with cellular base stations.

If care is not taken, performing wireless communications with cellular base stations can consume an excessive amount of power, resulting in the production of excessive heat in the electronic device and/or limiting battery life.

SUMMARY

A wireless network may include a user equipment device that communicates with one or more wireless base stations. The device may include a set of antennas and a radio. The radio may include a modem. The modem may have one or more demodulation and decoding (DMDC) clusters. The radio may convey wireless data with one or more base stations using a set of component carriers (CCs) that are concurrently-active under a carrier aggregation scheme or a dual connectivity scheme.

When the device enters a thermally-constrained condition or state, a resource manager on the radio may intelligently select one or more of the concurrently-active CCs to drop from use in conveying the wireless data. The resource manager may select the CC(s) to drop based on component carrier performance metric information and/or the bandwidths of the set of CCs. The component carrier performance metric information may include per-CC data rates, per-CC error rates, per-CC activation/deactivation rates, a power budget assigned to the radio, and/or information about the DMDC clusters on the modem. Intelligently selecting the CC(s) to drop in this way may provide greater reduction in power consumption and thus device temperature and/or may provide less reduction in wireless performance level than blindly dropping the most recently added CC from use in conveying the wireless data.

An aspect of the disclosure provides a method of using an electronic device to perform wireless communications. The method can include conveying, with a radio and one or more antennas, wireless data using a set of component carriers (CCs) that are concurrently active. The method can include dropping, at the radio, a CC from the set of CCs used to convey the wireless data, the dropped CC being selected based on performance metric information associated with the set of CCs.

An aspect of the disclosure provides a method of performing wireless communications using an electronic device. The method can include conveying, using a radio and one or more antennas, first wireless data over a set of component carriers (CCs). The method can include conveying, using the radio and the one or more antennas, second wireless data over a first subset of the set of CCs without conveying wireless data over a second subset of the set of CCs, the second subset being selected based on bandwidths of the CCs in the set of CCs.

An aspect of the disclosure provides an electronic device. The electronic device can include one or more antennas. The electronic device can include a radio communicably coupled to the one or more antennas, the radio being configured to convey wireless data over the one or more antennas using a primary component carrier (PCC) and a set of secondary component carriers (SCCs). The electronic device can include one or more processors configured to control the radio stop conveying the wireless data over an SCC from the set of SCCs that is selected based on wireless performance metric information associated with each SCC in the set of SCCs.

DETAILED DESCRIPTION

Figure 1:
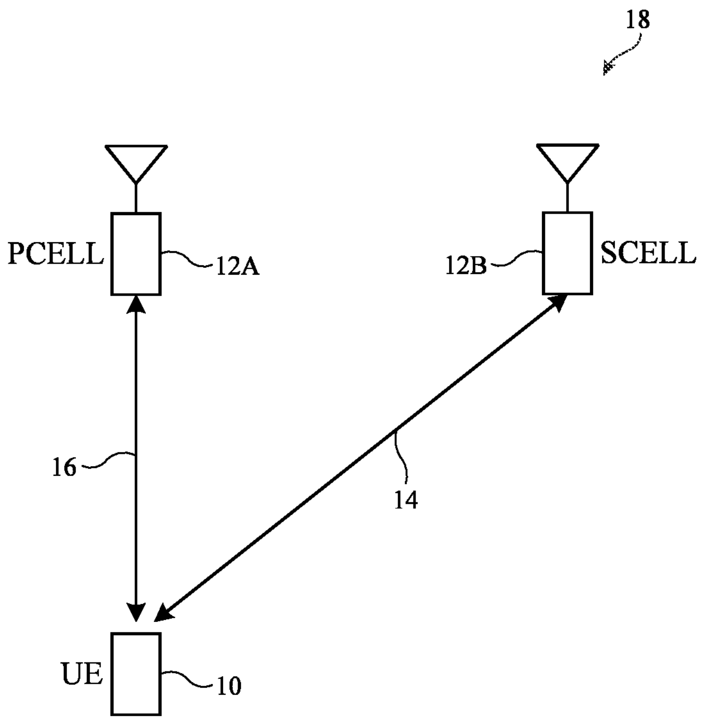
FIG. 1 is a diagram of an illustrative communications network having a user equipment device that communicates with one or more wireless base stations in accordance with some embodiments.

FIG. 1 is a schematic diagram of an illustrative communications system 18 (sometimes referred to herein as communications network 18) for conveying wireless data between communications terminals. System 18 may include network nodes (e.g., communications terminals). The network nodes may include user equipment (UE) such as one or more UE devices 10. The network nodes may also include external communications equipment (e.g., communications equipment other than UE devices 10) such as one or more wireless base stations 12.

It may be desirable to simultaneously receive and/or transmit radio-frequency signals at two or more different frequencies, sometimes referred to herein as component carriers (CCs), to increase data throughput for UE device 10. For example, UE device 10 may communicate using one or more communications protocols that support carrier aggregation (CA) and/or dual connectivity (DC) schemes (e.g., a 3GPP 5G NR FR1 and/or FR2 protocol, a Long Term Evolution (LTE) protocol, a 6G protocol, etc.). Under a CA scheme, wireless data is conveyed at each of the different frequencies (e.g., using each of the different CCs) using the same radio access technology (RAT). Under a DC scheme, wireless data is conveyed at two or more different frequencies (e.g., using each of the different CCs) using two or more different RATs.

By concurrently conveying wireless data using two or more CCs (e.g., using a CA or DC scheme), UE device 10 may be provided with increased data bandwidth relative to scenarios where only a single frequency is used. If desired, UE device 10 may simultaneously communicate with two or more base stations using two or more different CCs (e.g., device 10 may perform CA or DC over or with multiple base stations). For example, in implementations that support a CA or DC scheme, the wireless base stations 12 in system 18 may include at least a first base station (gNB) 12A and a second base station (gNB) 12B. UE device 10 may simultaneously communicate with both base station 12A and with base station 12B using the CA or DC scheme. UE device 10 may concurrently communicate with additional base stations 12B if desired (e.g., at additional frequencies).

When performing CA or DC with multiple base stations, UE device 10 may first establish a wireless connection with a single base station such as base station 12A. The first base station with which UE device 10 establishes a wireless link may sometimes be referred to herein as a primary base station, primary cell (PCELL) base station, or simply as a primary cell (PCELL). In the example of FIG. 1, base station 12A may be a PCELL base station and may therefore sometimes be referred to herein as PCELL base station 12A. Radio-frequency signals 16 conveyed between PCELL base station 12A and UE device 10 may sometimes be referred to herein as Primary Component Carrier (PCC) signals, primary signals, primary component signals, primary carrier signals, primary cell signals, or PCELL signals (e.g., PCELL signals 16) and the wireless links between PCELL base station 12A and UE device 10 may sometimes be referred to herein as primary connections, primary wireless links, or PCELL links. PCELL signals 16 may be conveyed using a corresponding component carrier, sometimes referred to herein as the Primary Component Carrier (PCC). The PCC has a corresponding frequency (sometimes referred to herein as the PCC frequency) and bandwidth (sometimes referred to herein as the PCC bandwidth).

Once a primary wireless connection has been established between UE device 10 and PCELL base station 12A, UE device 10 may establish one or more additional (supplemental or secondary) wireless connections/links with other base stations such as base station 12B (e.g., without dropping the connection with the PCELL base station). UE device 10 may then simultaneously communicate with both base stations (e.g., using different frequency resources in a CA or DC scheme). Additional base stations that establish a connection with UE device 10 after UE device 10 has established a wireless connection with a PCELL base station may sometimes be referred to herein as secondary base stations or secondary cell (SCELL) base stations. In the example of FIG. 1, base station 12B may be an SCELL base station and may therefore sometimes be referred to herein as SCELL base station 12B. Radio-frequency signals 14 conveyed between the SCELL base station 12B and UE device 10 may sometimes be referred to herein as Secondary Component Carrier (SCC) signals, secondary signals, secondary component signals, secondary carrier signals, SCC signals, or SCELL signals (e.g., SCELL signals 14), and the wireless links between the SCELL base station 12B and UE device 10 may sometimes be referred to herein as secondary connections or secondary wireless links.

SCELL signals 14 may be conveyed using a corresponding component carrier, sometimes referred to herein as the Secondary Component Carrier (SCC). The SCC may have a corresponding frequency (sometimes referred to herein as the SCC frequency) and bandwidth (sometimes referred to herein as the SCC bandwidth). If desired, UE device 10 may communicate with PCELL base station 12A, SCELL base station 12B, and/or additional SCELL base stations using additional SCELL signals 14 using additional SCCs (e.g., under a CA or DC scheme having a set of two or more SCCs for communicating with one or more base stations). Each SCC may have different respective frequency. Each SCC may have a respective bandwidth.

UE device 10 may establish a connection with a primary base station and one or more secondary base stations at downlink and uplink frequencies (e.g., downlink and uplink frequency bands). In other words, UE device 10 may perform wireless communications with base stations 12A and 12B using a CA or DC scheme in which radio-frequency signals are concurrently conveyed in uplink and/or downlink directions at one or more different frequencies (e.g., using one or more different CCs) with both base station 12A and base station 12B. For example, during wireless communications, UE device 10 may concurrently transmit uplink (UL) signals using multiple CCs (e.g., using multiple different uplink component carriers) to PCELL base station 12A and one or more SCELL base stations 12B. UE device 10 may also concurrently receive downlink (DL) signals from PCELL base station 12A and one or more SCELL base stations 12B using multiple CCs (e.g., using multiple different downlink component carriers). The assignment of different base stations as a PCELL base station (e.g., PCELL base station 12A) or an SCELL base station (e.g., SCELL base station 12B) may change over time.

System 18 may form a part of a larger communications network that includes network nodes coupled to base stations 12 via wired and/or wireless links. The larger communications network may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. The larger communications network may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE device 10 may send data to and/or may receive data from other nodes or terminals in the larger communications network via base stations 12 (e.g., base stations 12A and 12B may serve as an interface between UE device 10 and the rest of the larger communications network). Some or all of the communications network may, if desired, be operated by a corresponding network operator or service provider. Base stations 12 and nodes of communications system 18 other than UE device 10 may sometimes be referred to herein collectively as "the network."

Wireless base stations 12A and 12B may each include one or more antennas that provide wireless coverage for UE devices located within corresponding geographic areas or regions, sometimes referred to as cells. The size of the cells may correspond to the maximum transmit power level of the wireless base stations and the over-the-air attenuation characteristics for radio-frequency signals conveyed by the wireless base stations, for example.

Figure 2:
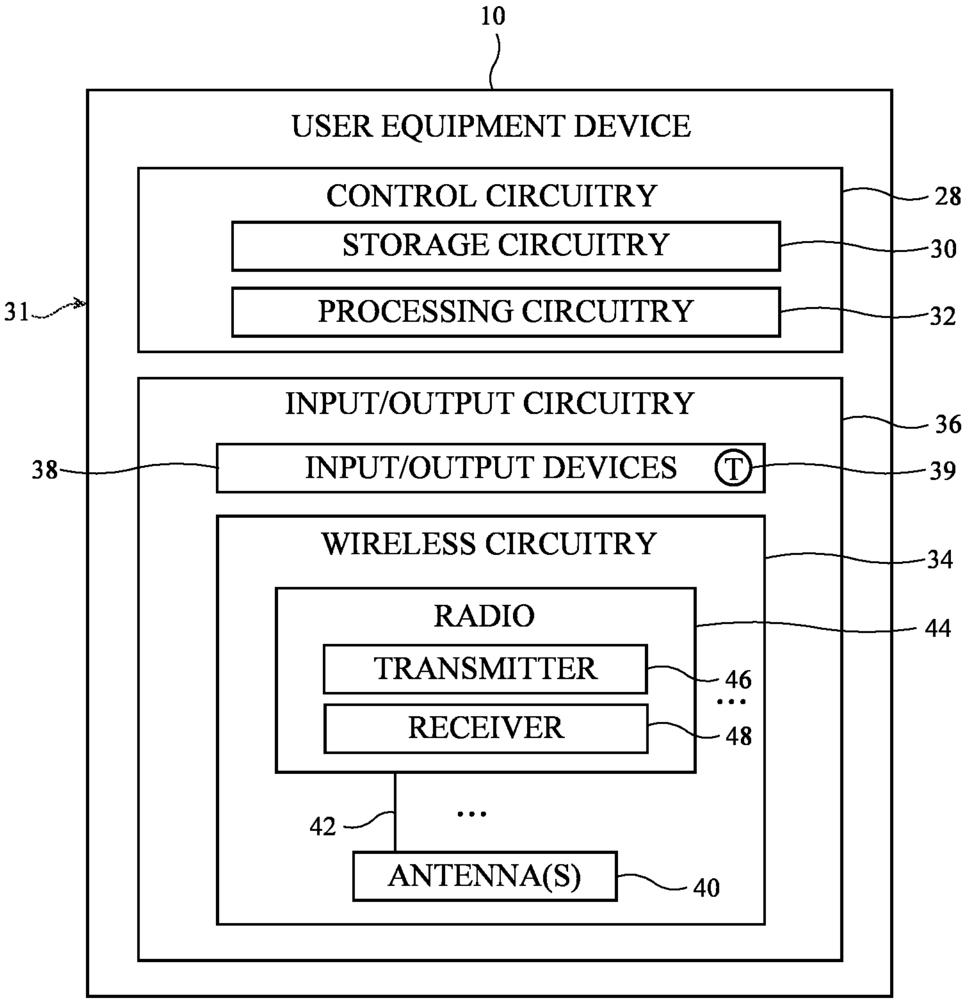
FIG. 2 is a functional block diagram of an illustrative user equipment device in accordance with some embodiments.

FIG. 2 is a block diagram of an illustrative UE device 10. UE device 10 may be an electronic device that is owned and/or operated by a user and that wirelessly communicates with external communications equipment. The external communications equipment may include a wireless base station (e.g., base stations 12 of FIG. 1), an access point, or another UE device, as examples. UE device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, equipment that implements the functionality of two or more of these devices, or other electronic equipment.

As shown in FIG. 2, UE device 10 may include components located on or within an electronic device housing such as housing 31. Housing 31, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 31 may be formed from dielectric or other low-conductivity material (e.g., glass, ceramic, plastic, sapphire, etc.). In other situations, housing 31 or at least some of the structures that make up housing 31 may be formed from metal elements.

UE device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 30 may include storage that is integrated within UE device 10 and/or removable storage media.

Control circuitry 28 may include processing circuitry such as processing circuitry 32. Processing circuitry 32 may be used to control the operation of UE device 10. Processing circuitry 32 may include on one or more processors such as microprocessors, microcontrollers, digital signal processors, host processors, baseband processor integrated circuits, application specific integrated circuits, central processing units (CPUs), graphics processing units (GPUs), etc. Control circuitry 28 may be configured to perform operations in UE device 10 using hardware (e.g., dedicated hardware or circuitry), firmware, and/or software. Software code for performing operations in UE device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on UE device 10 such as one or more software applications (apps). The applications may include satellite navigation applications, internet browsing applications, voice-over-internet-protocol (VOIP) telephone call applications, email applications, media playback applications, operating system functions, gaming applications, productivity applications, workplace applications, augmented reality (AR) applications, extended reality (XR) applications, virtual reality (VR) applications, scheduling applications, consumer applications, social media applications, educational applications, banking applications, spatial ranging applications, sensing applications, security applications, media applications, streaming applications, automotive applications, video editing applications, image editing applications, rendering applications, simulation applications, camera-based applications, imaging applications, news applications, and/or any other desired software applications.

To support interactions with external communications equipment, control circuitry 28 may be used in implementing communications protocols. Communications protocols that may be implemented using control circuitry 28 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.1 lad protocols (e.g., ultra-wideband protocols), cellular telephone protocols (e.g., 3G protocols, 4G (LTE) protocols, 3GPP Fifth Generation (5G) New Radio (NR) protocols, 6G protocols, cellular sideband protocols, etc.), device-to-device (D2D) protocols, antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communications protocol may be associated with a corresponding radio access technology (RAT) that specifies the physical connection methodology used in implementing the protocol. Radio-frequency signals conveyed using a cellular telephone protocol may sometimes be referred to herein as cellular telephone signals.

UE device 10 may include input-output circuitry 36. Input-output circuitry 36 may include input-output devices 38. Input-output devices 38 may be used to allow data to be supplied to UE device 10 and to allow data to be provided from UE device 10 to external devices. Input-output devices 38 may include user interface devices, data port devices, and other input-output components. For example, input-output devices 38 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature (T) sensors 39, etc. In some configurations, keyboards, headphones, displays, pointing devices such as trackpads, mice, and joysticks, and other input-output devices may be coupled to UE device 10 using wired or wireless connections (e.g., some of input-output devices 38 may be peripherals that are coupled to a main processing unit or other portion of UE device 10 via a wired or wireless link).

Input-output circuitry 36 may include wireless circuitry 34 to support wireless communications. Wireless circuitry 34 (sometimes referred to herein as wireless communications circuitry 34) may include one or more antennas 40. Wireless circuitry 34 may also include one or more radios 44. Radio 44 may include circuitry that operates on signals at baseband frequencies (e.g., baseband circuitry) and radio-frequency transceiver circuitry such as one or more radio-frequency transmitters 46 and one or more radio-frequency receivers 48. Transmitter 46 may include signal generator circuitry, modulation or encoder circuitry (e.g., in one or more modems), mixer circuitry for upconverting signals from baseband frequencies to intermediate frequencies and/or radio frequencies, amplifier circuitry such as one or more power amplifiers, digital-to-analog converter (DAC) circuitry, control paths, power supply paths, switching circuitry, filter circuitry, and/or any other circuitry for transmitting radio-frequency signals using one or more antennas 40. Receiver 48 may include demodulation or decoder circuitry (e.g., in one or more modems), mixer circuitry for downconverting signals from intermediate frequencies and/or radio frequencies to baseband frequencies, amplifier circuitry (e.g., one or more low-noise amplifiers (LNAs)), analog-to-digital converter (ADC) circuitry, control paths, power supply paths, signal paths, switching circuitry, filter circuitry, and/or any other circuitry for receiving radio-frequency signals using antennas 40. The components of radio 44 may be mounted onto a single substrate or integrated into a single integrated circuit, chip, package, or system-on-chip (SOC) or may be distributed between multiple substrates, integrated circuits, chips, packages, or SOCs.

Antenna(s) 40 may be formed using any desired antenna structures for conveying radio-frequency signals. For example, antenna(s) 40 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antenna(s) 40 over time. If desired, two or more of antennas 40 may be integrated into a phased antenna array (sometimes referred to herein as a phased array antenna) in which each of the antennas conveys radio-frequency signals with a respective phase and magnitude that is adjusted over time so the radio-frequency signals constructively and destructively interfere to produce a signal beam in a given pointing direction.

The term "convey radio-frequency signals" as used herein means the transmission and/or reception of the radio-frequency signals (e.g., for performing unidirectional and/or bidirectional wireless communications with external wireless communications equipment). Antenna(s) 40 may transmit the radio-frequency signals by radiating the radio-frequency signals into free space (or to free space through intervening device structures such as a dielectric cover layer). Antenna(s) 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Each radio 44 may be coupled to one or more antennas 40 over one or more radio-frequency transmission lines 42. Radio-frequency transmission lines 42 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 42 may be integrated into rigid and/or flexible printed circuit boards if desired. One or more radio-frequency lines 42 may be shared between multiple radios 44 if desired. Radio-frequency front end (RFFE) modules may be interposed on one or more radio-frequency transmission lines 42. The radio-frequency front end modules may include substrates, integrated circuits, chips, or packages that are separate from radios 44 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 42.

Radio 44 may transmit and/or receive radio-frequency signals within corresponding frequency bands at radio frequencies (sometimes referred to herein as communications bands or simply as "bands"). The frequency bands handled by radio 44 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired (e.g., using a radar scheme).

Control circuitry 28 may configure transmitter 46 to be inactive by powering off transmitter 46, by providing control signals to switching circuitry on power supply or enable lines for transmitter 46, by providing control signals to control circuitry on transmitter 46, and/or by providing control signals to switching circuitry within transmitter 46, for example. When transmitter 46 is inactive, some or all of transmitter 46 may be inactive (e.g., disabled or powered off) or transmitter 46 may remain powered on but without transmitting radio-frequency signals over antenna(s) 40. Similarly, control circuitry 28 may configure receiver 48 to be inactive by powering off receiver 48, by providing control signals to switching circuitry on power supply or enable lines for receiver 48, by providing control signals to control circuitry on receiver 48, and/or by providing control signals to switching circuitry within receiver 48, for example. When receiver 48 is inactive, some or all of receiver 48 may be disabled (e.g., powered off) or receiver 48 may remain powered on but without actively receiving radio-frequency signals incident upon antenna(s) 40. Transmitter 46 and receiver 48 may consume more power on UE device 10 when active than when inactive (e.g., a battery on UE device 10 may drain more rapidly while transmitter 46 and receiver 48 are active than while transmitter 46 or receiver 48 are inactive). Transitioning transmitter 46 or receiver 48 from an inactive state to an active state may sometimes be referred to herein as waking the transmitter or receiver.

The example of FIG. 2 is illustrative and non-limiting. While control circuitry 28 is shown separately from wireless circuitry 34 in the example of FIG. 1 for the sake of clarity, wireless circuitry 34 may include processing circuitry (e.g., one or more processors) that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include one or more processors that forms a part of the baseband circuitry (e.g., one or more baseband processors), digital control circuitry, analog control circuitry, modem circuitry and/or other control circuitry in radio 44. The baseband circuitry may, for example, access a communication protocol stack on control circuitry 28 (e.g., storage circuitry 30) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 34.

The communications protocol governing radio-frequency signals 16 and 14 of FIG. 1 may support CA and/or DC operations. CA operations may include standalone (SA) CA operations and non-standalone (non-SA) CA operations. SA CA operations involve using only a 5G NR communications protocol to support radio-frequency signals 16 and 14 (e.g., both the PCELL signals and the SCELL signals are conveyed over 5G NR frequency bands). Non-SA CA operations involve using the LTE communications protocol as an anchor for radio-frequency signals 16 and 14 while also using the 5G NR communications protocol to boost the anchor. UE device 10 may convey data or voice traffic with PCELL base station 12A and one or more SCELL base station 14B using an SA CA scheme, a non-SA CA scheme, and/or a DC scheme.

Figure 3:
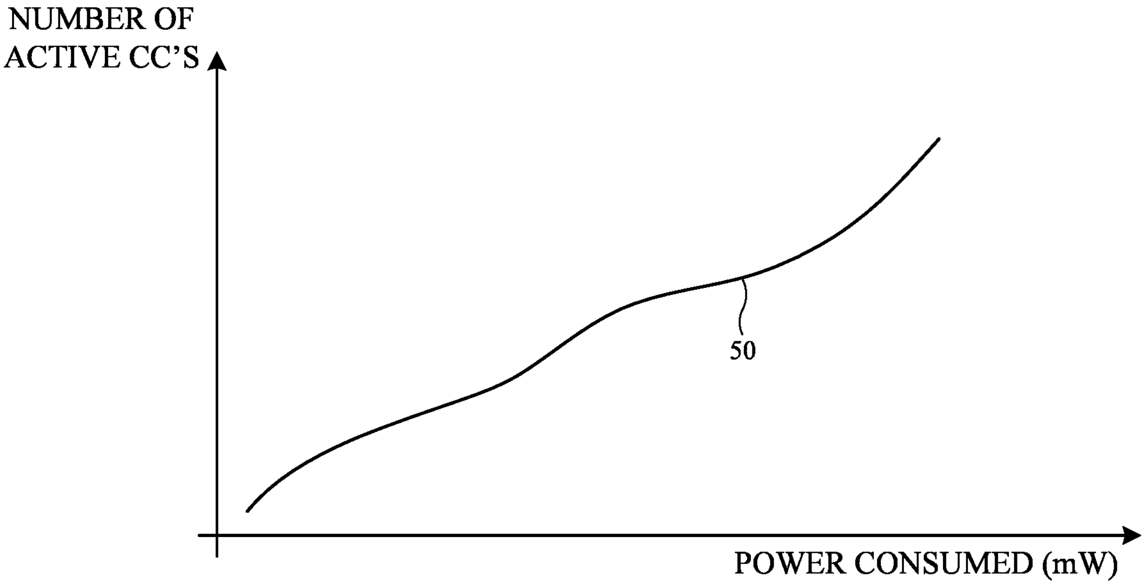
FIG. 3 is a plot showing how power consumed by an illustrative user equipment device increases as the number of active component carriers used to perform wireless communications increases in accordance with some embodiments.

When performing wireless communications under a CA or DC scheme, UE device 10 may convey PCELL signals using a PCC and may concurrently convey SCELL signals using a set of one or more SCCs. The SCCs from the set of SCCs that are actively being used to convey wireless data may sometimes be referred to herein as active (added) SCCs or active (added) CCs. Increasing the number of active SCCs at a given time may serve to increase the peak data throughput achievable by UE device 10 in conveying wireless data with base stations 12 under the CA or DC scheme. On the other hand, the power consumed by radio 44 (e.g., in mW) generally increases as the number of active SCCs increases, as shown by curve 50 of FIG. 3.

Figure 4:
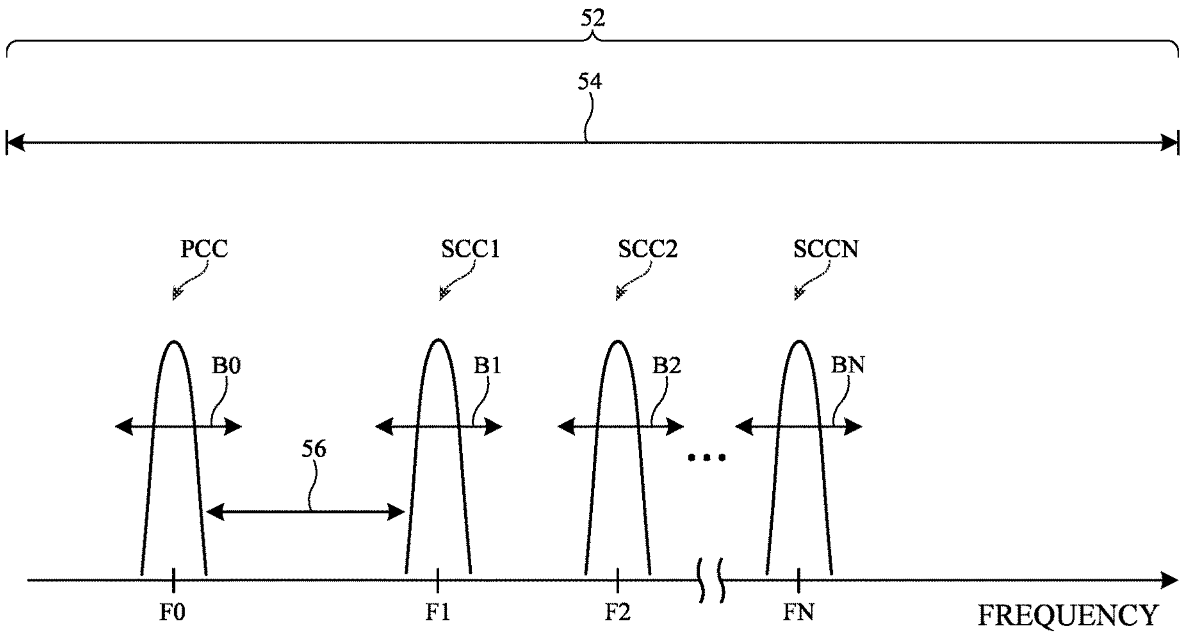
FIG. 4 is a frequency plot showing how an illustrative user equipment device may perform wireless communications using multiple active component carriers in accordance with some embodiments.

While performing wireless communications, the network assigns (schedules) time and frequency resources for UE device 10 to transmit and/or receive radio-frequency signals. FIG. 4 is a diagram showing illustrative frequency resources that may be assigned to UE device 10 for conveying radio-frequency signals (e.g., with some or all of PCELL base station 12A and one or more SCELL base stations 12B of FIG. 1).

As shown in FIG. 4, the network may assign a frequency band 52 for UE device 10 to transmit and/or receive radio-frequency signals. Frequency band 52 may have a corresponding bandwidth (BW) 54. Frequency band 52 may be divided into a number of frequency ranges sometimes referred to as component carriers (CCs). The CCs may include a PCC and/or one or more SCCs. The assignment of a CC as a PCC or SCC may change over time.

For example, frequency band 52 may include at least a Primary Component Carrier PCC and a set of N Secondary Component Carriers (SCCs), where N is greater than or equal to 1 (e.g., a first Secondary Component Carrier SCC1, a second Secondary Component Carrier SCC2, an Nth Secondary Component Carrier SCCN, etc.). The example of FIG. 4 in which the PCC and all N of the SCCs in the set of SCCs belong to frequency band 52 is illustrative and non-limiting. If desired, the PCC may be in a first frequency band 52 whereas the set of SCCs are in a second frequency band 52, the PCC may be in a first frequency band 52 whereas the set of SCCs is distributed across two or more other frequency bands 52, the PCC may be in the same frequency band 52 as one or more of the SCCs in the set of SCCs whereas the other SCCs in the set of SCCs are distributed across one or more other frequency bands 52, etc.

The PCC may be at a corresponding frequency F0. The N SCCs in the set of SCCs may each be at a different respective frequency F (e.g., SCC1 may be at frequency F1, SCC2 may be at frequency F2, SCCN may be at frequency FN, etc.). The PCC may have a corresponding bandwidth B0. The N SCCs in the set of SCCs may each have a respective bandwidth B (e.g., SCC1 may have bandwidth B1, SCC2 may have bandwidth B2, SCCN may have bandwidth BN, etc.). Bandwidth B0 may be different from one or all of the bandwidths B of the set of SCCs or may be the same as one or more of the bandwidths B of the set of SCCs. The bandwidths B of the set of SCCs may all by the same or two or more of bandwidths B may be different.

Frequency band(s) 52 may include one or more 5G NR FR1 bands, one or more 5G NR FR2 bands, one or more 4G LTE bands, and/or other bands (e.g., that support a CA or DC scheme). The CA scheme implemented by radio 44 may be an intra-band CA scheme (e.g., in which the PCC and the set of SCCs are within the same frequency band 52) and/or may be an inter-band CA scheme (e.g., in which the PCC and the set of SCCs are distributed across two or more frequency bands 52).

Each CC may be separated from one or two adjacent CCs (e.g., the PCC or any of the N SCCs) by a corresponding frequency separation 56. The frequency separation between any two adjacent CCs may be zero or may be non-zero. When the frequency separation between two adjacent CCs is zero, those CCs may sometimes be referred to as contiguous CCs (e.g., intra-band contiguous CCs). When the frequency separation between two adjacent CCs is non-zero, those CCs may sometimes be referred to as non-contiguous CCs (e.g., intra-band non-contiguous CCs when both CCs belong to the same frequency band 52 and inter-band non-contiguous CCs when the CCs belong to different frequency bands 52). The frequency separation between inter-band non-contiguous CCs in first and second frequency bands 52 also includes the frequency separation between the first and second frequency bands.

Each CC may each include one or more bandwidth parts (BWPs) (not shown). Each bandwidth part may extend (in frequency) across some or all of the bandwidth of its corresponding CC. Each BWP may include a set of contiguous physical resource blocks of the corresponding CC. Each physical resource block (PRB) is divided in the frequency domain into a corresponding set of contiguous resource elements (RE). Each RE is the smallest unit of the resource grid defined by the communications protocol governing frequency band(s) 52 (e.g., the 5G NR protocol, the 4G LTE protocol, etc.). For example, each RE may be defined by a single subcarrier in frequency and a single symbol in the time domain.

Each CC may have any desired number of BWPs (e.g., as defined by the corresponding communications protocol). Each BWP may occupy a respective subset of the frequency resources of its CC (e.g., different ranges of frequencies within the bandwidth B of the corresponding CC). If desired, one or more of the BWPs may extend across the entire bandwidth B of the corresponding CC. In general, the CCs may each include a number of configured bandwidth parts having any desired bandwidths extending between any desired frequencies (e.g., as allowed by the 3GPP NR physical layer specification). The set of one or more BWPs assigned to UE device 10 and the corresponding hardware setting on UE device 10 to communicate using that set of one or more BWPs may sometimes be referred to herein as the BWP configuration of UE device 10.

Some features of the communications protocol governing radio 44 can consume relatively large amounts of power, such as Enhanced Mobile Broadband of the 5G NR protocol. The communications protocol may include one or more CA and/or DC configurations with different CCs and bandwidths that can cause radio 44 to consume excessive power. Excessive power consumption by radio 44 can reduce battery life for UE device 10 and can produce undesirably high temperatures at one or more surfaces UE device 10, which can be uncomfortable for the user of UE device 10. While increasing the number of SCCs that are actively used by radio 44 for conveying wireless data can increase overall data throughput, increasing the number of SCCs also increases the power consumption of radio 44 and thus the temperature of UE device 10.

UE device 10 may monitor its operating temperature at one or more locations (e.g., using one or more temperature sensors 39 of FIG. 2, which gather temperature measurements or temperature data). In some situations, UE device 10 may power itself off when the device temperature exceeds a threshold temperature (e.g., for more than a threshold time period), thereby allowing UE device 10 to cool down before continuing operation. However, such hardware shutdowns terminate wireless communication and are generally disruptive to user experience.

In some implementations, UE device 10 may attempt to reduce power consumption and thus device temperature by dropping (deactivating) the most recently added SCC when UE device 10 becomes excessively hot or begins to consume excessive power. Consider the example of FIG. 4. In this example, radio 44 may first establish communications using the PCC and may then begin to sequentially add (activate or enable) each of the N SCCs from SCC1 to SCCN. Radio 44 may convey wireless data (e.g., UL data and/or DL data) using each the PCC and each of the N added SCCs. When UE device 10 becomes excessively hot or begins to consume excessive power, radio 44 may deactivate the most recently added or activated SCC, such as SCCN of FIG. 4. Radio 44 may stop using the deactivated SCC to convey wireless data with the corresponding base station (e.g., while continuing to use the remaining active SCCs from the set of SCCs and the PCC to convey wireless data under the scheduled CA/DC scheme). As the number of active CCs is reduced in this example, radio 44 will consume less power than when all N SCCs are active, allowing UE device 10 to cool off and conserve battery. Transitioning from conveying wireless data using an SCC to not conveying wireless data using the SCC (e.g., ceasing communications using a previously-active SCC) may sometimes be referred to herein as deactivating, disabling, dropping, or reducing the SCC.

In practice, the most recently added SCC may not be the optimal SCC for radio 44 to drop from a thermal and/or performance standpoint. For example, dropping the most recently added SCC (e.g., SCCN in FIG. 4) may reduce power consumption by radio 44 and thus device temperature less than dropping other SCCs from the set of N active SCCs. Similarly, dropping the most recently added SCC (e.g., SCCN in FIG. 4) may deteriorate the wireless performance quality of radio 44 more than dropping other SCCs from the set of N active SCCs. It would therefore be desirable to be able to intelligently select an SCC from the set of N active SCCs to drop from wireless communications under CA or DC in a manner that optimizes reduction in power consumption and wireless performance.

Figure 5:
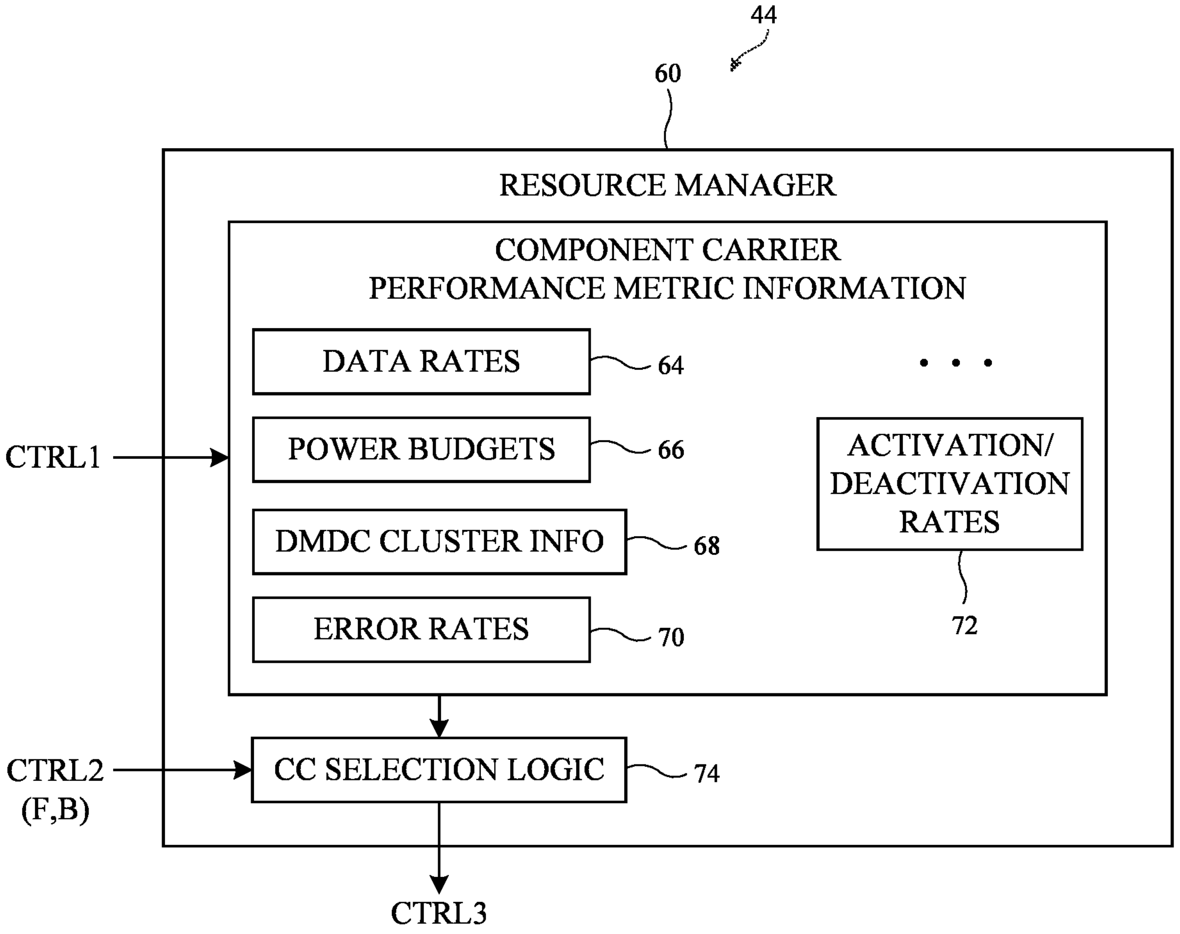
FIG. 5 is a diagram of an illustrative resource manager that monitors component carrier performance metric information for selecting a component carrier to drop during wireless communications in a manner that optimizes thermal efficiency in accordance with some embodiments.

Radio 44 may include a resource manager that intelligently selects an SCC from the set of N active SCCs to drop from wireless communications in a manner that optimizes reduction in power consumption and wireless performance. FIG. 5 is diagram showing how radio 44 may include a resource manager (RM) 60 (sometimes referred to herein as resource and state manager 60) for selecting an SCC to drop in a manner that optimizes reduction in power consumption and wireless performance. Resource manager 60 may be implemented in the baseband circuitry of radio 44, for example. The components of resource manager 60 may be implemented using hardware (e.g., sets of any desired digital logic gates arranged in any desired manner and controlled using one or more processors, registers, memory, one or more processors, etc. configured to perform the operations of resource manager 60), firmware, and/or software (e.g., as executed by one or more processors in the baseband circuitry of radio 44 and/or control circuitry 28 of FIG. 2).

As shown in FIG. 5, resource manager 60 may generate, gather, identify, produce, measure, track, receive, and/or monitor component carrier performance metric information 62. Resource manager 60 may compile, aggregate, and/or store component carrier performance metric information 62 (e.g., in storage circuitry 30 of FIG. 2, one or more registers, memory, etc.) prior to, during, and/or after radio 44 transmits and/or receives wireless data or other radio-frequency signals.

Resource manager 60 may receive a first control signal CTRL1 from other components in radio 44, wireless circuitry 34 (FIG. 2), input/output devices 38 (e.g., sensors), and/or control circuitry 28 (e.g., an application processor (AP) of UE device 10). Control signal CTRL1 may identify some or all of the CC performance metric information 62 gathered and stored by resource manager 60. Control signal CTRL1 may serve to update CC performance metric information 62 over time as radio 44 continues to transmit and/or receive radio-frequency signals. CC performance metric information 62 may sometimes also be referred to herein as wireless performance metric information 62 or wireless performance metric data 62.

CC performance metric information 62 may include any desired information characterizing the wireless performance and/or power consumption of radio 44 in transmitting and/or receiving radio-frequency signals or wireless data in radio-frequency signals. As shown in the example of FIG. 5, CC performance metric information 62 may include at least data rate information such as one or more data rates 64, power budget information such as one or more power budgets 66, demodulation and decoding (DMDC) cluster information 68, error rate information such as one or more error rates 70, activation/deactivation rate information such as one or more activation/deactivation rates 72, and/or any other desired wireless performance metric data associated with the transmission and/or reception of radio-frequency signals by radio 44 (e.g., signal-to-noise ratio (SNR) values, noise floor values, signal quality values, data characterizing the presence of interference, transmitted power level values, received power level values, received signal strength indicator (RSSI) values, receiver sensitivity values, impedance values, scattering parameter values, voltage standing wave ratio (VSWR) values, reference signal received power (RSRP) values, etc.).

Some or all of CC performance metric information 62 may include performance metric information associated with each active CC of radio 44. For example, data rates 64 may include the data rate of each active CC being used by radio 44 to convey wireless data, error rates 70 may include the error rate of each active CC being used by radio 44 to convey wireless data, activation/deactivation rates 72 may include the activation/deactivation rate 72 of each active CC being used by radio 44 to convey wireless data, etc.

Each data rate 64 may be indicative of the amount of data traffic conveyed per unit time over the corresponding CC. Each data rate 64 may sometimes also be referred to herein as a per-CC data rate or a data rate per CC. Radio 44 may actively monitor the data rate of each CC and may provide data rates 64 to resource manager 60 for further processing (e.g., in control signal CTRL1). In general, higher data rates are associated with greater power consumption. For example, an active SCC that exhibits a higher data rate may cause radio 44 to consume more power and thus generate more heat than an active SCC that exhibits a lower data rate. As such, dropping an active SCC that exhibits a higher data rate may cause greater temperature reduction for UE device 10 than dropping an active SCC that exhibits a lower data rate. At the same time, dropping an active SCC having a higher data rate may cause a greater deterioration in wireless performance level for radio 44 than dropping an active SCC having a lower data rate.

Each error rate 70 may be indicative of the amount of data transmission or reception errors produced using the corresponding CC per unit time. Each error rate 70 may sometimes also be referred to herein as a per-CC error rate or an error rate per CC. Error rates 70 may include bit error rate values, block error rate (BLER) values, symbol error rate values, or any other desired error rate values. Radio 44 may actively monitor the error rate of each CC and may provide error rates 64 to resource manager 60 for further processing (e.g., in control signal CTRL1). Dropping an active SCC with a relatively high error rate may, for example, deteriorate wireless performance for radio 44 less than dropping an active SCC with a relatively low error rate.

Each activation/deactivation rate 72 may be indicative of the number of times the corresponding CC has been activated (added) and deactivated (dropped) per unit time. Each activation/deactivation rate 72 may sometimes also be referred to herein as a per-CC activation/deactivation rate or an activation/deactivation rate per CC. Activation/deactivation rates 72 may sometimes also be referred to as deactivation/activation rates 72 or more simply as activation rates 72 or deactivation rates 72. Radio 44 may actively monitor the error rate of each CC and may provide error rates 64 to resource manager 60 for further processing (e.g., in control signal CTRL1). For example, radio 44 may monitor the serving quality (e.g., RSRP) of each active SCC and may identify frequent activations or deactivations of each active SCC based on the monitored serving quality, which result in media access control (MAC) control element (CE) activation/de-activation. Dropping an active SCC with a relatively high activation/deactivation rate may, for example, deteriorate wireless performance for radio 44 less than dropping an active SC with a relatively low activation/deactivation rate.

Power budgets 66 may be generated by a power management engine on UE device 10 (e.g., implemented in hardware and/or software in radio 44 and/or elsewhere on UE device 10). The power management engine may, for example, be implemented using AP of UE device 10. The power management engine may, if desired, implement or execute a Code and Power Management Scheme (CPMS) that identifies and processes system level information to periodically generate and apply different power budgets to different components within UE device 10 (e.g., in a manner that optimally balances power consumption with performance level). The power management engine may provide power budgets 66 (e.g., one or more power budgets assigned by the power management engine to radio 44 governing the amount of power to be consumed by radio 44 in transmitting and/or receiving radio-frequency signals).

DMDC cluster information 68 may identify one or more DMDC clusters in one or more modems of radio 44 that are available for use in conveying wireless data, as well as information about the DMDC clusters. Radio 44 may, for example, include a modem having two or more DMDC clusters that demodulate and decode incoming wireless data using different resources or modem circuitry. For example, each DMDC cluster may operate at a corresponding clocking frequency and power supply voltage. Each DMDC cluster may support communications using a corresponding set of CCs.

As shown in FIG. 5, resource manager 60 may include CC selection logic 74. CC selection logic 74 may receive a second control signal CTRL2 from other components in radio 44, wireless circuitry 34 (FIG. 2), input/output devices 38, sensors, and/or control circuitry 28 (e.g., the AP of UE device 10). Control signal CTRL2 may identify the frequency F and the bandwidth B of each of the active CCs being used by radio 44 to convey wireless data. For example, control signal CTRL2 may identify frequency F0, frequencies F1 through FN, bandwidth B0, and bandwidths B1 through BN of FIG. 4 when radio 44 communicates using the PCC and the set of N SCCs shown in FIG. 4.

CC selection logic 74 may include any desired hardware logic (e.g., digital logic gates, logic controlled or operated by one or more processors) and/or software logic (e.g., in software executed by one or more processors) that selects an SCC for radio 44 to drop (remove) in a manner that maximizes the reduction in power consumption by radio 44 and thus device temperature while concurrently minimizing the reduction in wireless performance level of radio 44 produced by dropping the selected SCC. In other words, CC selection logic 74 may select an SCC for radio 44 to drop that optimizes reduction in power consumption/temperature and wireless performance.

CC selection logic 74 may generate, calculate, compute, produce, output, or otherwise identify the selected SCC based on CC performance metric information 62 (e.g., one or more of data rates 64, power budgets 66, DMDC cluster information 68, error rates 70, and/or activation/deactivation rates 72) and/or control signal CTRL2 (e.g., the frequency F and/or bandwidth B of each active CC). CC selection logic 74 may generate, produce, or output a third control signal CTRL3 that identifies the selected SCC. CC selection logic 74 may provide control signal CTRL3 to radio 44. Radio 44 may identify the selected SCC from control signal CTRL3 and may drop (remove) the selected SCC from subsequent communications (e.g., radio 44 may convey wireless data using the PCC and the set of (N−1) SCCs that include each of the SCCs from the set of N SCCs in FIG. 4 except for the selected SCC). By dropping (e.g., removing or ceasing transmission over) the selected SCC, radio 44 may reduce power consumption and device temperature more than blindly dropping the most recently activated SCC and/or may deteriorate the wireless performance of radio 44 less than blindly dropping the most recently activated SCC. This may serve to optimize power consumption, battery life, device temperature, and wireless performance for UE device 10 while performing wireless communications using the CA or DC scheme.

Figure 6:
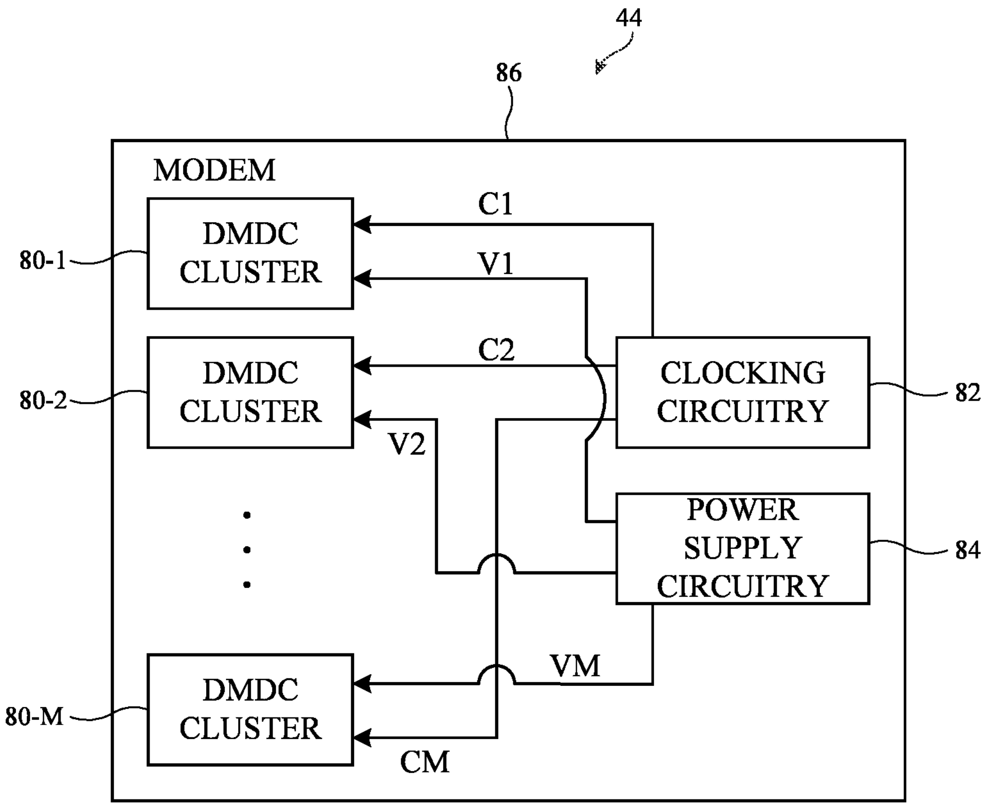
FIG. 6 is a diagram of an illustrative modem having multiple demodulation and decoding (DMDC) clusters in accordance with some embodiments.

FIG. 6 is a diagram showing how radio 44 may include a modem having multiple DMDC clusters. As shown in FIG. 6, radio 44 may include a modem such as modem 86. Modem 86 may form part of transmitter 46 (FIG. 2), may form a part of receiver 48, or may form part of both transmitter 46 and receiver 48 (e.g., a transceiver in radio 44). Modem 86 may include a set of M DMDC clusters 80 (e.g., a first DMDC cluster 80-1, a second DMC cluster 80-2, an Mth DMDC cluster 80-M, etc.).

Modem 86 may include clocking circuitry 82 (e.g., one or more local oscillators, phase-locked loops, and/or other clocking circuitry) that generates a different respective clocking signal C for each DMDC cluster 80. For example, clocking circuitry 82 may clock DMDC cluster 80-1 using a first clocking signal C1, may clock DMDC cluster 80-2 using a second clocking signal C2, may clock DMDC cluster 80-M using an Mth clocking signal CM, etc. As one example, DMDC cluster 80-1 may run at a clocking frequency C1 of 300 MHz, DMDC cluster 80-2 may run at a clocking frequency of 600 MHz, and DMDC cluster 80-M may run at a clocking frequency of 900 MHz. If desired, the clocking frequency of a given DMDC cluster may be adjusted over time and/or two or more of the DMDC clusters may run simultaneously at the same clocking frequency.

Modem 86 may also include power supply circuitry 84 that generates a different respective power supply voltage V (e.g., from one or more different system power supply voltages) for powering each DMDC cluster 80. For example, power supply circuitry 84 may power DMDC cluster 80-1 using a first power supply voltage V1, may power DMDC cluster 80-2 using a second power supply voltage V2, may power DMDC cluster 80-M using an Mth power supply voltage VM, etc. If desired, the power supply voltage of a given DMDC cluster may be adjusted over time and/or two or more of the DMDC clusters may be powered simultaneously using the same power supply voltage. The power supply voltages produced by power supply circuitry 84 may include a relatively high power supply voltage VHIGH, a moderate power supply voltage VMID that is less than power supply voltage VHIGH, and a relatively low power supply voltage VLOW that is less than power supply voltage VMID, as one example.

Each DMDC cluster 80 may include a respective set of demodulation and/or decoding circuitry that decodes and/or demodulates received wireless data at the corresponding clocking frequency C received from clocking circuitry 82 and using the corresponding power supply voltage V received from power supply circuitry 84. Each DMDC cluster 80 may support demodulation/decoding using a respective set of CCs (e.g., up to six or more CCs per DMDC cluster).

Figure 7:
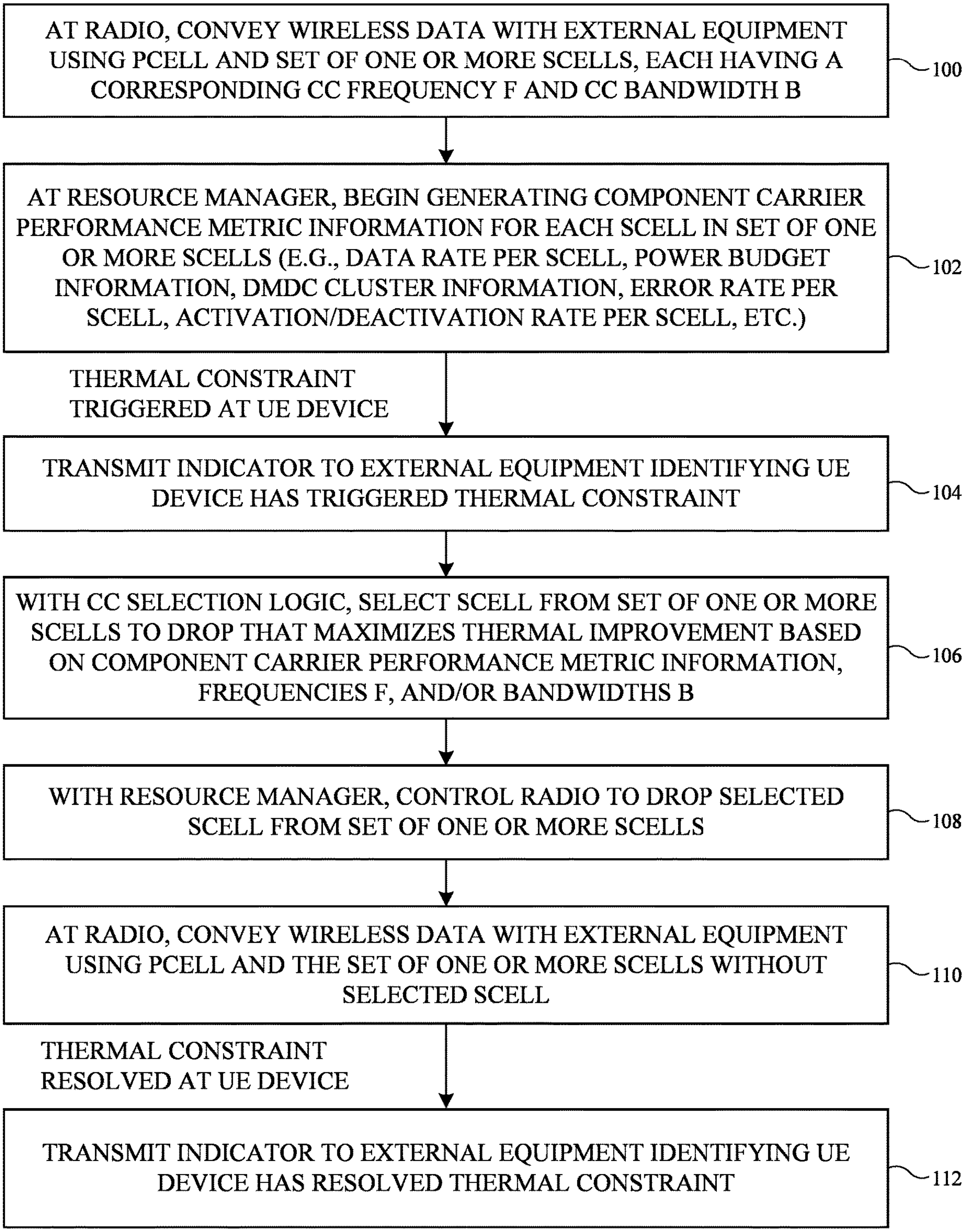
FIG. 7 is a flow chart of illustrative operations involved in performing wireless communications with external equipment in a manner that optimizes thermal efficiency in accordance with some embodiments.

FIG. 7 is a flow chart of operations involved in using radio 44 to convey wireless data (e.g., under a CA or DC scheme) while optimizing power consumption (device temperature) and wireless performance level.

At operation 100, radio 44 may begin using one or more antennas 40 to convey wireless data with external equipment such as PCELL base station 12A and one or more SCELL base stations 12B (FIG. 1). Radio 44 may convey the wireless data using multiple concurrently-active CCs. For example, radio 44 may convey wireless data using the PCC at frequency F0 and bandwidth B0 (FIG. 4). Radio 44 may then begin to add (activate) the SCCs from the set of N SCCs at frequencies F1 through FN and bandwidths B1 through BN (FIG. 4). Radio 44 may convey wireless data using the set of N SCCs concurrently with the PCC. Radio 44 may provide information identifying the active CCs (e.g., CC identifiers), information identifying the frequencies F of the active CCs, and information identifying the bandwidths B of the active CCs to CC selection logic 74 of FIG. 5 (e.g., using control signal CTRL2). The concurrently-active CCs may, for example, be scheduled for UE device 10 by the network (e.g., under the CA or DC scheme).

At operation 102, resource manager 60 may begin generating (e.g., identifying, retrieving, receiving, producing, outputting, computing, gathering, measuring, sensing, etc.) component carrier performance metric information 62 from the wireless data conveyed over the active CCs. For example, resource manager 60 may begin to receive control signal CTRL1 from radio 44 and/or the AP on UE device 10 identifying the data rate 64 of each active CC, the error rate 70 of each active CC, the activation/deactivation rate 72 of each CC, DMDC cluster information 68, and/or power budgets 66 (FIG. 5). Resource manager 60 may store component carrier performance metric information 62 and may compile, aggregate, and/or update the stored component carrier performance metric information 62 over time as more wireless data is conveyed over the active CCs.

Radio 44 may continue to convey wireless data using the active CCs while generating component carrier performance metric information 62. When radio 44 triggers a thermal constraint of UE device 10, processing may proceed to operation 104. Radio 44 may trigger the thermal constraint when radio 44 begins to consume more than a threshold amount of power in conveying the wireless data, when the temperature at one or more locations on UE device 10 (e.g., as measured by temperature sensor(s) 39 of FIG. 2) exceeds a threshold temperature, when the power management engine on UE device 10 decides to power down some or all of UE device 10 to avoid overheating or excessive power consumption, when the overall data rate or data throughput of radio 44 exceeds a threshold value, and/or when an application running on UE device 10 indicates that UE device 10 is about to enter or has entered a thermally-constrained state or situation, as examples. In general, the trigger condition may be any desired trigger condition for UE device 10 to begin dropping active CCs (e.g., potentially sacrificing wireless performance level) to reduce power consumption and/or temperature on UE device 10.

At operation 104, radio 44 may transmit a signal to the external equipment (e.g., one or more base stations 12) that includes an indicator identifying that UE device 10 has triggered the thermal constraint (e.g., identifying that UE device 10 has become too hot or is consuming excessive power such that the UE device may drop one or more of the active CCs). The indicator may include a channel quality indicator (CQI). For example, radio 44 may transmit a CQI having a value of zero to indicate that radio 44 is in a thermally-constrained situation. Operation 104 may be omitted if desired.

At operation 106, CC selection logic 74 may select (e.g., generate, calculate, compute, produce, output, identify, etc.) an SCC to drop from the set of N SCCs that will optimize reduction in power consumption/temperature and wireless performance (e.g., that maximizes the reduction in power consumption by radio 44 and thus device temperature while concurrently minimizing the reduction in wireless performance level of radio 44). CC selection logic 74 may use any desired algorithm or logic to select the SCC. CC selection logic 74 may select the SCC based on CC performance metric information 62 (e.g., one or more of data rates 64, power budgets 66, DMDC cluster information 68, error rates 70, and/or activation/deactivation rates 72), the frequency F of each active CC, and/or the bandwidth B of each active CC.

At operation 108, resource manager 60 (e.g., one or more processors on UE device 10) may control radio 44 to drop the selected SCC from the set of N SCCs (e.g., from CA/DC) for subsequent communications with the external equipment. For example, CC selection logic 74 may output a control signal CTRL3 that identifies the selected SCC and radio 44 may use control signal CTRL3 to identify the selected SCC. Radio 44 may reconfigure the circuitry of transmitter 46 and/or receiver 48 (FIG. 2) to cease conveying wireless data over the selected SCC At operation 110, radio 44 may continue conveying wireless data with the external equipment using the PCC and the set of N SCCs but without using the selected SCC. In other words, radio 44 may convey the wireless data with the external equipment using the PCC and (N−1) SCCs (e.g., using the set of N SCCs except for the selected SCC, which was dropped by radio 44). By dropping the selected SCC, UE device 10 may consume less power and thus produce less thermal heat, allowing UE device 10 to cool off and exit the thermally-constrained state. Dropping the selected SCC may produce greater reduction in power consumption (and thus greater reduction in heat generation) and/or less impact to the wireless performance of radio 44 than blindly dropping the most recently added SCC, for example.

When the thermally constrained situation has been resolved at UE device 10 (e.g., when the amount of power consumed drops below the threshold level, when the temperature drops below the threshold level, etc.), processing may proceed to operation 112. At operation 112, radio 44 may transmit a signal to the external equipment (e.g., one or more base stations 12) that includes an indicator identifying that UE device 10 has resolved or exited the thermal constraint. The indicator may include a CQI. For example, radio 44 may transmit a CQI having a non-zero value to indicate that radio 44 is no longer in a thermally-constrained situation. Operation 112 may be omitted if desired. UE device 10 may drop the selected CC without informing the network about which CC was selected to be dropped.

The example of FIG. 7 in which CC selection logic 74 selects a single SCC to drop is illustrative in non-limiting. In general, CC selection logic 74 may select a subset of the set of N SCCs to drop. The subset may include any desired number of one or more SCCs. While sometimes referred to herein in connection with dropping SCC(s), in general CC selection logic 74 may select any of the active CCs to drop (e.g., the PCC or any of the N SCCs).

The following are a few non-limiting and illustrative examples of the processing logic that may be used by resource manager 60 to intelligently select the SCC to drop based on component carrier performance metric information 62, frequencies F, and/or bandwidths B of FIG. 5 (e.g., while processing operation 106 of FIG. 7).

As one example, resource manager 60 may select the active SCC having the highest data rate 64 as the SCC to drop. This SCC may be a major contributor to power consumption on radio 44 and dropping the SCC may provide significant power and temperature reduction. Alternatively, resource manager 60 may drop every SCC that has a data rate 64 that exceeds a threshold data rate (e.g., a subset of the N SCCs having data rates exceeding the threshold data rate). If dropping the SCC(s) having the highest data rate(s) 64 still does not allow UE device 10 to exit the thermal constraint, resource manager 60 may then select one or more additional SCCs to drop based on activation/deactivation rates 72. For example, resource manager 60 may then drop the active SCC having the highest activation/deactivation rate 72 or may drop one or more active SCCs having an activation/deactivation rate 72 that exceeds a threshold activation/deactivation rate.

If two or more SCCs have a similar or equal high data rates 64 (e.g., the highest data rates of the set of N SCCs or data rates exceeding the threshold data rate) and similar or equal RSRP and thus similar or equal activation/deactivation rates 72, CC selection logic 74 may break the tie based on the bandwidth B of each SCC. For example, CC selection logic 74 may select the SCC having the higher bandwidth B as the SCC to drop. Consider an example in which radio 44 performs SA FR1 communications using a first SCC having a 100 MHz bandwidth, a second SCC having a 40 MHz bandwidth, and a third SCC having a 20 MHz bandwidth. If all three SCCs convey a similar amount of data traffic (and thus have similar data rates 64) and have similar RSRP (and thus have similar activation/deactivation rates 72), dropping the first SCC having the 100 MHz bandwidth may provide the most power/temperature reduction for radio 44.

As another example, resource manager 60 may select the active SCC having the highest activation/deactivation rate 72 to drop. Alternatively, resource manager 60 may drop every SCC that has an activation/deactivation rate 72 that exceeds a threshold activation/deactivation rate (e.g., a subset of the N SCCs having activation/deactivation rates exceeding the threshold activation/deactivation rate). Frequent activation/deactivation can cause radio 44 to consume excessive power and/or can detriment wireless performance, so dropping the SCC(s) with high activation/deactivation rates 72 may provide significant power/temperature reduction and/or may provide minimal detriment to wireless performance.

As yet another example, resource manager 60 may select the active SCC having the highest bandwidth B to drop. Alternatively, resource manager 60 may drop every SCC that has a bandwidth B that exceeds a threshold bandwidth (e.g., a subset of the N SCCs having bandwidths B exceeding the threshold bandwidth). Higher bandwidths can generally cause radio 44 to consume more power than lower bandwidths, so dropping the SCC(s) with high bandwidths B may provide significant power/temperature reduction for UE device 10.

In another example, resource manager 60 may select the DMDC cluster 80 on modem 86 (FIG. 6) having the best thermal efficiency and/or wireless performance. Radio 44 may use the CCs of the selected DMDC cluster 80 to convey wireless data (e.g., at operation 100 of FIG. 7). Resource manager 60 may then select one or more SCCs to drop from the selected DMDC cluster 80 (e.g., CC selection logic 74 may select the SCC(s) to drop based on DMDC cluster information 68 of FIG. 5). For example, resource manager 60 may select the DMDC cluster 80 having SCCs that exhibit the lowest overall power consumption and/or the best wireless performance and may use those SCCs to convey wireless data. Resource manager 60 may then use any desired logic to drop one or more of the SCCs from the selected DMDC cluster 80 (e.g., may drop the SCC(s) having the highest data rate of the selected DMDC cluster, the highest activation/deactivation rate of the selected DMDC cluster, the highest bandwidth B of the selected DMDC cluster, etc.). In examples where the SCCs are contiguous and from a single frequency band (e.g., the set of eight SCCs from band N260), resource manager 60 may drop SCCs based on the DMDC cluster set of contiguous carriers that provides the most thermal efficiency. Resource manager 60 may select particular SCCs to drop using any desired logic (e.g., may drop the SCC having the highest data rate, highest activation/deactivation rate, highest bandwidth B, etc.).

When resource manager 60 selects CC(s) to drop based on the distribution of the CC(s) among DMDC clusters so the DMDC cluster voltage steps down from VHIGH to VMID or from VMID to VLOW, dropping CC(s) in this way may lead to a reduction in power consumption by as much as 250-300 mW, for example. When the allocation of CCs is distributed between two or three DMDC clusters 80, then allocating CCs in a single DMDC cluster until it reaches its maximum capacity (e.g., six CCs) may lead to reduction in power consumption by as much as 100 mW if the DMDC clusters operate using the same clocking frequency.

In an example with six FR2 DL CCs, radio 44 may map/distribute the CCs to DMDC clusters in different ways. For example, a first DMDC cluster (e.g., DMDC cluster 80-1 of FIG. 6) may be occupied by all six CCs and may have a relatively high clock frequency (e.g., 900 MHz) and may be powered by a relatively high power supply voltage V (e.g., VHIGH or VMID). As another example, the first DMDC cluster may be occupied by three CCs while a second DMDC cluster (e.g., DMDC cluster 80-2 of FIG. 6) is occupied by the other three CCs. In this example, each DMDC cluster may run at a lower clock frequency (e.g., 600 MHz) and may be powered by a relatively low power supply voltage V (e.g., VMID or VLOW) while exhibiting similar wireless performance. This reduction in clock frequency and power supply voltage by re-mapping the CCs between DMDC clusters 80 may lead to a reduction in power consumption by as much as 250-300 mW, for example.

If desired, CC selection logic 74 may decide which CCs and the aggregated BW that radio 44 can handle at any given time based on a power budget 66 received from the power management engine on UE device 10. Power budget 66 may also include PHY layer information identifying how long UE device 10 or radio 44 is to remain in a particular power state (e.g., a high power state, a low power state, a moderate power state, etc.). Resource manager 60 may then apply mitigations by reducing CA (e.g., by selecting one or more SCCs to drop at operation 106 of FIG. 7) that serve to meet its current power budget 66. In general, any desired logic may be used to select (based on any desired component carrier performance metric information, frequencies F, and/or bandwidths B) any desired CCs to drop that serve to optimize power consumption (thermal efficiency) and wireless performance more than blindly dropping the most recently added CC.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-7 may be performed by the components of UE device 10 using software, firmware, and/or hardware (e.g., dedicated circuitry or hardware). Software code for performing these operations may be stored on non-transitory computer readable storage media (e.g., tangible computer readable storage media) stored on one or more of the components of UE device 10 (e.g., storage circuitry 30 of FIG. 2). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of UE device 10 (e.g., processing circuitry 32 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A method of using wireless circuitry, the method comprising:

conveying, using a radio, wireless data using a set of component carriers (CCs) that are concurrently active; and removing, at the radio, a CC from the set of CCs used to convey the wireless data, wherein the removed CC comprises a CC from the set of CCs having a highest activation/deactivation rate.

2. The method of claim 1, wherein the removed CC is selected based on performance metric information, and wherein the performance metric information comprises data rates of the CCs in the set of CCs and the removed CC is selected based on the data rates.

3. The method of claim 2, wherein the removed CC comprises a CC from the set of CCs having a highest data rate.

4. The method of claim 1, wherein the removed CC is selected based on performance metric information, and wherein the performance metric information comprises error rates of the CCs in the set of CCs and the removed CC is selected based on the error rates.

5. The method of claim 4, wherein the removed CC comprises a CC from the set of CCs having a highest error rate.

6. The method of claim 1, wherein the removed CC is selected based on performance metric information, and wherein the performance metric information comprises activation/deactivation rates of the CCs in the set of CCs and the removed CC is selected based on the activation/deactivation rates.

7. The method of claim 1, wherein the removed CC is selected based on a power budget of the radio.

8. The method of claim 1, wherein the removed CC is selected based on demodulation and decoding information associated with a modem on the radio.

9. The method of claim 1, wherein the removed CC is selected based on bandwidths of the CCs in the set of CCs.

10. The method of claim 1, further comprising:

selecting the removed CC in response to a temperature of the device exceeding a threshold temperature.

11. The method of claim 1, further comprising:

transmitting, using the radio, a channel quality indicator (CQI) having a value of zero prior to removing the CC from the set of CCs used to convey the wireless data; and transmitting, using the radio, a non-zero CQI after removing the CC from the set of CCs used to convey the wireless data.

12. The method of claim 1, wherein conveying the wireless data comprises conveying the wireless data using a carrier aggregation (CA) scheme or a dual connectivity (DC) scheme.

13. Wireless circuitry comprising:

a transmitter configured to transmit radio-frequency signals using a set of component carriers that are concurrently active; and one or more processors configured to control the radio transmitter to remove, from the set of component carriers used to transmit the radio-frequency signals, a component carrier that is associated with an activation/deactivation rate that exceeds a threshold activation/deactivation rate.

14. The wireless circuitry of claim 13, wherein the component carrier is associated with a highest activation/deactivation rate of the set of component carriers.

15. The wireless circuitry of claim 13, the one or more processors being further configured to measure activation/deactivation rates of the component carriers in the set of component carriers.

16. The wireless circuitry of claim 13, the one or more processors being further configured to remove the component carrier after a temperature of the wireless circuitry exceeds a threshold temperature.

17. The wireless circuitry of claim 13, the one or more processors being further configured to remove the component carrier after a power consumption of the wireless circuitry exceeds a threshold power consumption.

18. The wireless circuitry of claim 13, the one or more processors being further configured to remove an additional component carrier that is associated with an additional activation/deactivation rate that exceeds the threshold activation/deactivation rate from the set of component carriers used to transmit the radio-frequency signals.

19. A method of operating wireless circuitry, the method comprising:

transmitting, using a transmitter during a first time period, radio-frequency signals using a set of component carriers that are concurrently active; and transmitting, using the transmitter during a second time period after the first time period, the radio-frequency signals using the set of component carriers except for a component carrier from the set of component carriers that is associated with an activation/deactivation rate that exceeds a threshold.

20. The method of claim 19, wherein the activation/deactivation rate that exceeds the threshold is a highest activation/deactivation rate of the set of component carriers.

* * * * *